(12) United States Patent
Quintanilla et al.

(10) Patent No.: US 8,745,636 B2
(45) Date of Patent: Jun. 3, 2014

(54) COMMUNICATION EVENT MANAGEMENT METHODS, MEDIA AND SYSTEMS

(75) Inventors: Carrie Lea Quintanilla, Cedar Park, TX (US); Susan Bales Anderson, Jonestown, TX (US)

(73) Assignee: Dell Products L.P., Round Rock, TX (US)

( * ) Notice: Subject to any disclaimer, the term of this patent is extended or adjusted under 35 U.S.C. 154(b) by 1227 days.

(21) Appl. No.: 12/260,368

(22) Filed: Oct. 29, 2008

(65) Prior Publication Data

US 2010/0107179 A1 Apr. 29, 2010

(51) Int. Cl.
*G06F 9/46* (2006.01)
*G06F 3/048* (2013.01)
*G06F 9/54* (2006.01)
*G06F 3/0481* (2013.01)

(52) U.S. Cl.
CPC .............. *G06F 9/542* (2013.01); *G06F 3/0481* (2013.01); *Y10S 715/975* (2013.01)
USPC ........................... 719/318; 715/808; 715/975

(58) Field of Classification Search
None
See application file for complete search history.

(56) References Cited

U.S. PATENT DOCUMENTS

| 7,458,080 | B2 * | 11/2008 | Parker et al. ................... 719/318 |
| 7,827,561 | B2 * | 11/2010 | McKee et al. .................. 719/313 |
| 7,865,904 | B2 * | 1/2011 | McKee et al. .................. 719/318 |
| 7,890,960 | B2 * | 2/2011 | McKee et al. .................. 719/318 |
| 2003/0160818 | A1 * | 8/2003 | Tschiegg et al. .............. 715/743 |
| 2004/0061716 | A1 | 4/2004 | Cheung et al. |
| 2005/0187896 | A1 * | 8/2005 | Mousseau ......................... 707/1 |

\* cited by examiner

*Primary Examiner* — Qing Wu
(74) *Attorney, Agent, or Firm* — Baker Botts L.L.P.

(57) ABSTRACT

A method for managing a communication event in an information handling system (IHS) is disclosed herein. The method includes receiving at least one communication event at an interrupt manager, wherein the interrupt manager manages the at least one communication event from an application. The method further includes receiving a selection of an interrupt manager setting in response to at least one communication event and generating at least one event notification based on the interrupt manager setting selected.

18 Claims, 4 Drawing Sheets

```
Select Interrupt Level:

☐ High

☐ Moderate (Default)

☐ Low

☐ Custom

┌──────────┐
                    │  Next/   │
                    │ Finished │
                    └──────────┘
```

COMMUNICATION EVENT MANAGEMENT METHODS, MEDIA AND SYSTEMS

BACKGROUND

1. Technical Field

The present disclosure relates generally to the field of information handling systems, and more specifically, to managing communication events in information handling systems.

2. Background Information

As the value and use of information continues to increase, individuals and businesses seek additional ways to process and store information. One option available to users is an information handling system. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Applications installed on an IHS by an end user and/or a manufacturer may, in some cases, require periodic interaction with the user. For instance, communication events such as application interrupts may require user interactions, responses and/or acknowledgements. As used herein, a communication event may include any application interrupt or interrupt generated by an application or program to indicate that a particular event has or will occur. In response to the communication event generated, an event notification may be provided to a user to inform the user of the application interrupt. An application interrupt may trigger an event notification in the form of a pop-up window, for instance, containing text and/or graphics which may require a response from user. As an example, an event notification may be provided by a program in the form of a pop-up to inform a user that an updated version is available for download by the user. In addition, the interrupt may prompt a user to download the update at a particular time and may include additional options, such as a designation to remind the user of the update at a later time or incremental time period. While some users would prefer to be notified of application interrupts for such events, other users may prefer not to experience the interrupts either at all or with a particular frequency. In order to modify, disable, or reduce the occurrence of application interrupts, a user may need to configure the options of each application providing the interrupts. The interrupts, provided by each of the applications, may vary in complexity and configurability. As a result, configuring each application may be time consuming and the process may be inconsistent as well as prone to errors. Thus, a need exists for methods, media and systems for providing a centralized process for managing application interrupts executed on an IHS.

SUMMARY

The following presents a general summary of several aspects in order to provide a basic understanding of the disclosure. This summary is not an extensive overview of the disclosure nor is it intended to identify key or critical elements of the disclosure or to delineate the scope of the claims. The following summary merely presents some aspects of the disclosure in a general form as a prelude to the more detailed description that follows.

One aspect of the disclosure provides a method for managing a communication event in an information handling system (IHS) is disclosed herein. The method includes receiving at least one communication event at an interrupt manager, wherein the interrupt manager manages the at least one communication event from an application. The method further includes receiving a selection of an interrupt manager setting in response to at least one communication event and generating at least one event notification based on the interrupt manager setting selected.

Another aspect of the disclosure provides a computer-readable medium having encoded thereon computer-executable instructions for managing a communication event in an information handling system (IHS), the computer-executable instructions performing a method including receiving at least one communication event at an interrupt manager, wherein the interrupt manager manages the at least one communication event from an application. The method further includes receiving a selection of an interrupt manager setting in response to at least one communication event and generating at least one event notification based on the interrupt manager setting selected.

Yet another aspect of the disclosure provides an information handling system including a memory and a processor coupled to the memory. The system further includes an interrupt manager module operable to receive a selection of an interrupt manager setting, the selection of the interrupt manager setting handled by the processor to generate at least one event notification associated with a communication event of an application, wherein the at least one event notification is based on the interrupt manager setting selected.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present methods are described, it is to be understood that this disclosure is not limited to the particular methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a menu" may refer to one or several menus, and reference to "a method of managing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
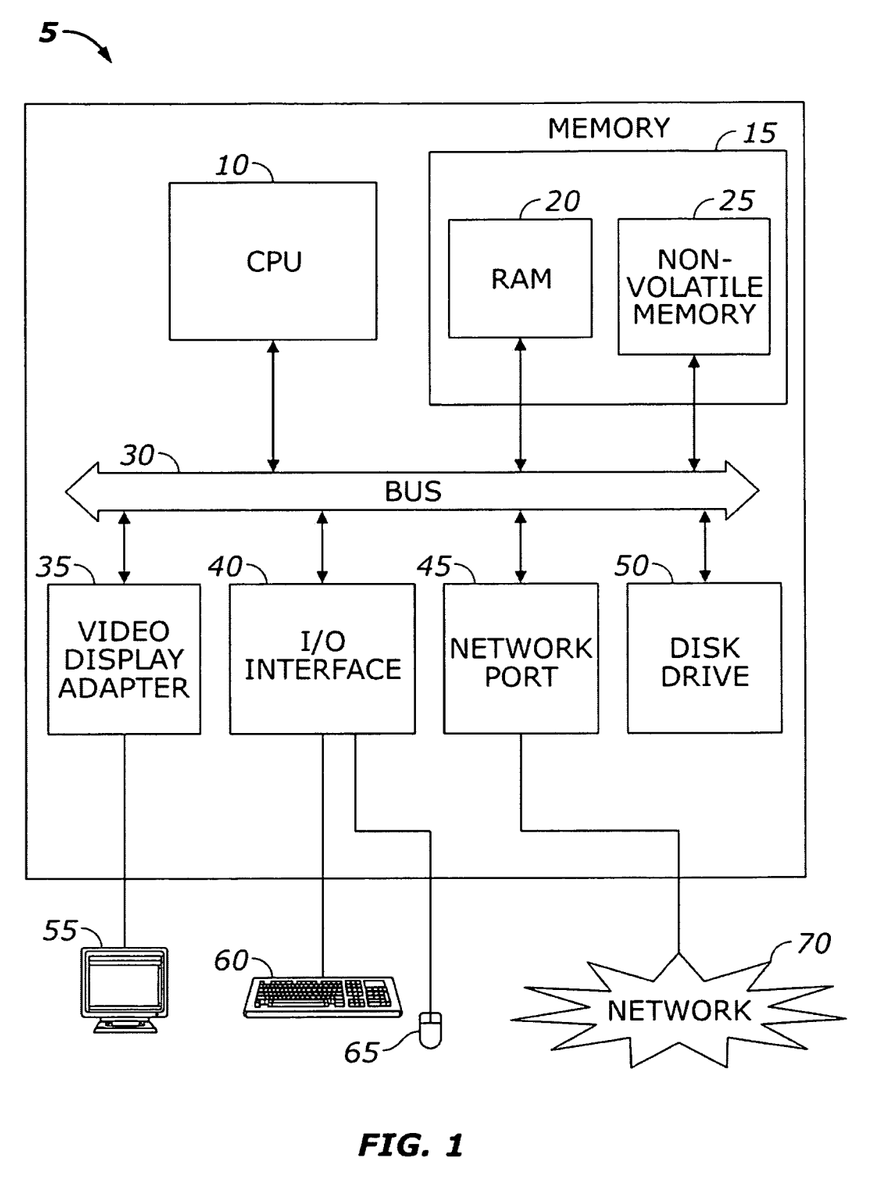
FIG. 1 is schematic illustrating an information handling system (IHS) in accordance with one aspect the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

When a customer purchases an IHS, applications may be preinstalled on the IHS by the manufacturer or later installed by the customer/end user. Some applications may provide communication events, such as an application interrupt, detected by software or hardware components of the IHS. Examples of communication events may include, but are not limited to, the availability of a software update for download, a request for registration data of a user and the completion of a task performed by an application. In turn, an event notification in the form of a pop-up window, for example, may be generated by the program to notify a user of the particular communication event. In some cases, the event notification may require user interaction by way of a user response such as making a selection, acknowledging the event notification, providing information, or the like. Based on the user response, the application may perform a corresponding task such as, for example, downloading a selected update and the like. Tasks performed as a result of the user response may call upon the application to perform a set of actions or conversely, to not perform a set of actions. For example, an event notification may prompt the user to download the application update(s) at the present or future time, select particular updates to be downloaded, restart the IHS, enter registration information, shutdown the IHS and save current settings, or the like. While some users may prefer receiving the event notifications, others may be dissatisfied with such notifications or pop-up windows, wishing to discontinue their execution. In order to reduce or disable the execution of the event notifications, a user may need to configure the options for an application providing such notifications. In the case of multiple applications executing on a particular IHS, each application may provide pop-ups, for example, requiring the user to configure each application to disable or reduce the occurrence of the pop-ups. By way of example, a user may access an options menu within an application and select settings that modify the nature and occurrence of the event notifications provided by the application. In the case of a novice user, the user may find the process of configuring event notifications within applications complex and confusing. Further, configuring several applications to reduce or eliminate event notifications may be time consuming. In some situations, the pop-up options provided by one application may not be consistent with the pop-up options of other applications. Even experienced users may experience difficulty in configuring the applications to provide a consistent pop-up scheme applicable to the multiple applications.

In order to provide a centralized process for managing communication events within an IHS, interrupt manager software may be installed on an IHS. Rather than allowing each application to manage its respective interrupts, the communication events from one or multiple applications may be provided to a centralized interrupt manager. The interrupt manager may receive the communication events from several applications and manage the communication events provided to a user in accordance with a user's selected notification settings as discussed below.

Figure 2:
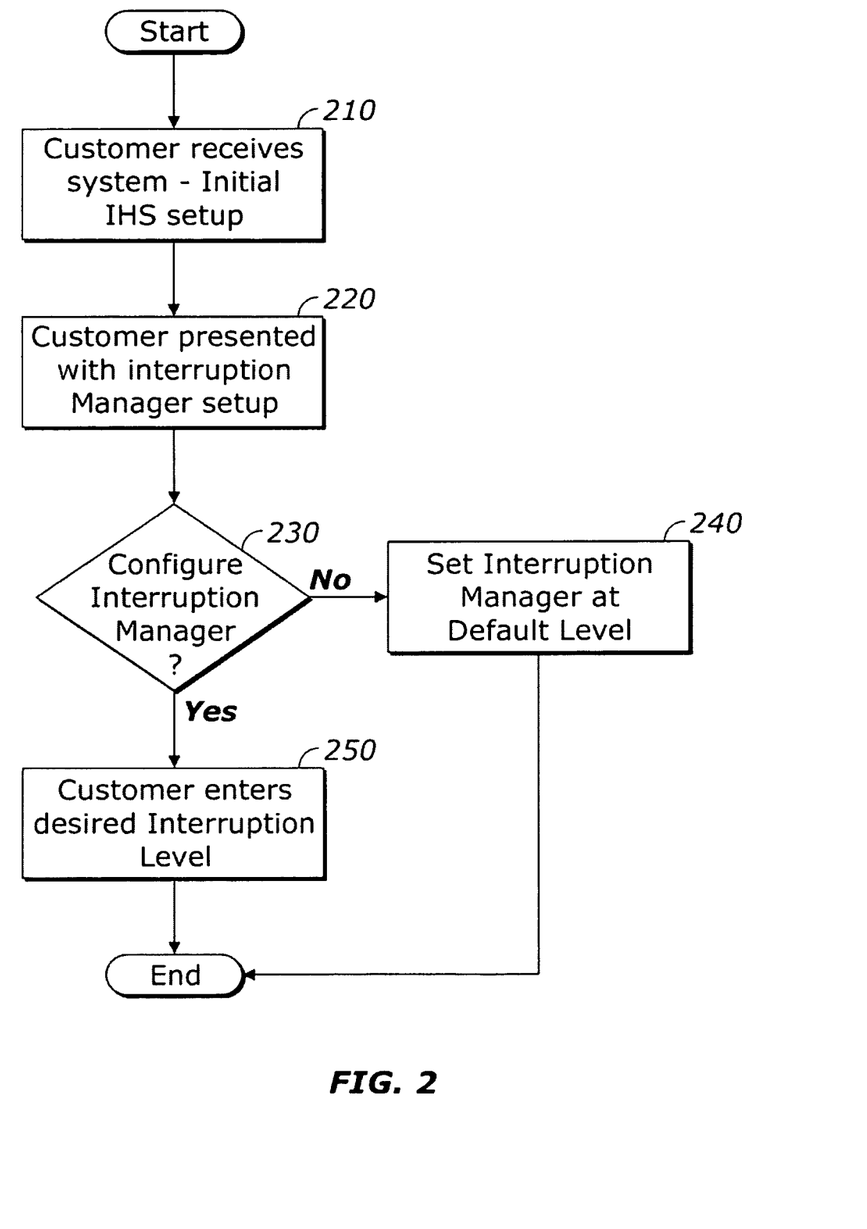
FIG. 2 is flow diagram representing a boot configuration method in accordance with one aspect of the present disclosure.

FIG. 2 illustrates one implementation of a boot configuration method in accordance with the present disclosure. When a customer initially receives a purchased IHS, an initial IHS setup (e.g., out of box experience (OOBE)) may be executed the first time the IHS is booted in step 210. During an initial IHS setup, the user may be asked to perform several initial tasks to configure the operating system (OS) and applications preinstalled on the IHS. For instance, the user may be prompted to provide product keys, establish a user account, configure network and internet settings, engage in a tutorial for operating the IHS, and/or other additional tasks. Once the initial IHS configuration is complete, an interrupt manager setup may be initiated in step 220. The interrupt manager may be an application pre-installed locally (e.g., installed and executed from the hard drive) and stored in memory. To facilitate user settings and preferences, any suitable interface may be employed which can be modified at any time to suit a user's changing needs.

Continuing with FIG. 2, when the interrupt manager setup is initiated, an initial menu may prompt the user to decide to configure the interrupt manager at the current or later time in step 230. If the user chooses to bypass the interrupt manager setup, the interrupt manager may be set at a default interrupt level in step 240. The designation of an interrupt level may correspond generally to the occurrence or frequency at which event notifications regarding application interrupts are to be presented to a user. For instance, the default interrupt level may be set at a high interrupt level, thus instructing a particular application to convey all event notifications to an end user. Alternatively, a low interrupt level may be associated with presenting no or a low frequency of event notifications to a user. If the user chooses to configure the interrupt manager, then in step 250 an interrupt manager menu may be provided to the user. The user may select a desired interrupt level or may enter an advanced interrupt manager setup as discussed in detail below. Utilizing the interrupt manager menus discussed herein, the user may indicate desired interrupt manager settings that define which event notifications or pop-ups may be blocked by the interrupt manager and or displayed to the user. After the user configures the interrupt manager settings, the initial boot IHS configuration process is complete and the interrupt manager may filter communication events in accordance with the user's interrupt manager settings. While the initial setup provides a user with an initial opportunity to configure an interrupt manager, it is understood that a user may reconfigure or modify the settings for the interrupt manager at any later time.

Figure 3:
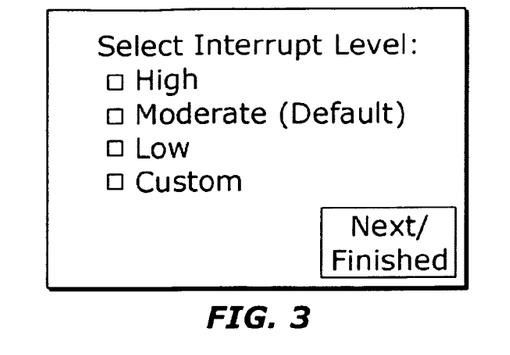
FIG. 3 is a schematic illustrating interrupt manager menu in accordance with one aspect of the present disclosure.

Referring now to FIG. 3, a schematic is provided illustrating one implementation of an interrupt manager menu in accordance with the present disclosure. An interrupt manager menu may provide a basic menu which allows a user to configure or modify the interrupt manager settings according to predefined setting levels. The interrupt manager menu may be accessed by selecting the interrupt manager from an operating system (OS) start menu, actuating an interrupt manager icon on the desktop or system tray or any other suitable method for executing an application.

The menu may provide several predefined setting levels, such as a high, moderate, and low interrupt levels to meet the needs of different users. At a high interrupt level, all event notifications may be provided to a user regardless of whether the notification requires a user response. For instance, the interrupt manager may allow notices indicating that the IHS has connected to a wireless network, notices that optional program version updates are available for download or any other event notifications which do not require any user response. A high interrupt level may be well suited for a user that wishes to be well informed and desires to have each task approved before it is performed. A moderate interrupt level may restrict event notifications, for example, to streaming interrupts or interruptions generated by select program vendors (e.g., Adobe, Microsoft). Streaming interrupts may include application pop-ups which do not require interaction by the user. For example, within a moderate interrupt level which allows streaming interrupts, pop-ups which notify the user that an optional software update is available, a battery is low, or printer ink is low may be allowed while other pop-ups requiring a response by the user may be blocked by the interrupt manager.

In one implementation, an application interrupt generating an event notification requiring user interaction may be flagged based on classification (e.g., medium or high importance) since user interaction may be needed to prevent any change in the operation of the IHS. In another implementation, a critical interrupt may be flagged to always pass to the user immediately but may still be received by the interrupt manager. For instance, notice of the trial period expiration for a particular application, designated as a critical interrupt, may be flagged to bypass the user. In such as event, automatic installation of the application or its update may be initiated without any notice provided to the user.

At a low interrupt level, substantially all event notifications may be suppressed by the interrupt manager. At a low interrupt level, according to one implementation, an event notification requiring user interaction may be blocked which prevents the application from requesting a response from the user. For some requests, such as asking a user to select updates, the interrupt manager may automatically select tasks associated with the interrupt to be performed. In some cases, event notifications requiring user interaction (e.g., software updates, registration requests, and maintenance reminders) may not be critical to proper operation of the IHS and may be blocked in a low interrupt level. The low interrupt level may be intended for a user who wishes to have an IHS automatically perform tasks related to application interrupts whenever possible. For instance, a warning significant to the functionality of an IHS, such as a low battery warning or a software trial expiration warning, may be flagged so that a user may still be notified of important events regardless of the interrupt level set by the user.

While exemplary implementations of the interrupt manager menu are provided herein, any suitable implementation of a menu or graphical user interface (GUI) may be utilized. In one implementation, the interrupt manager menu may provide a default setting or recommended setting to the user, such as the moderate interrupt level. In another implementation, additional predefined levels or fewer predefined levels may be included in the interrupt manager menu. Further, the interrupt manager menu may include a single or multiple links to information regarding the different interrupt levels.

Figure 4:
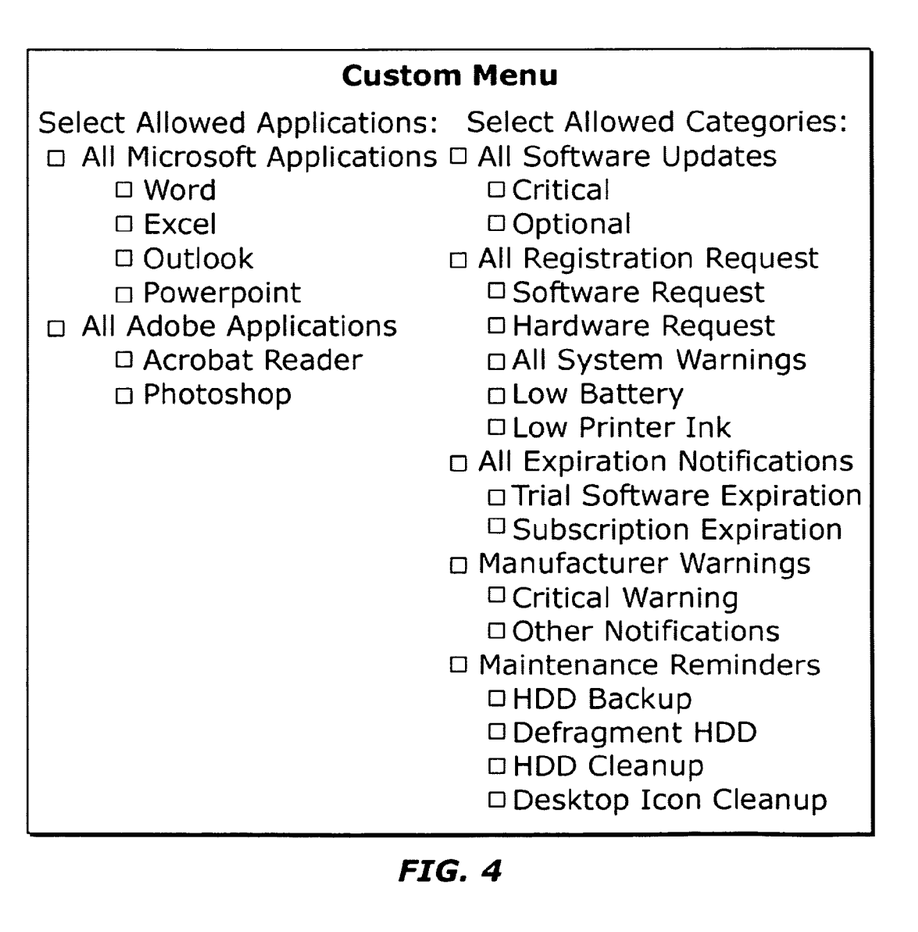
FIG. 4 is a schematic illustrating a custom interrupt manager menu in accordance with one aspect of the present disclosure.

As an alternative to selecting one of the predefined levels, a user may customize an interrupt manager setting. When a user selects "custom" or the like in the interrupt manager menu, the user may proceed to a custom interrupt manager menu. A custom interrupt level may allow a user to customize interrupt settings in accordance with the type or category of communication events and/or event notifications. FIG. 4 provides a schematic illustrating one implementation of a custom interrupt manager menu. According to one aspect, a custom interrupt manager menu may allow a user to manage interrupt settings based on the categorization of application interrupt, event notification and/or the applications providing the application interrupt or communication event. One portion of the custom interrupt manager menu may provide an applications section that lists several applications, which may be organized by the vendor (e.g., Microsoft) providing the software (e.g., Word, Excel, Outlook, Powerpoint, Publisher) or pop-up type (e.g., pop-up, streaming). A user may select an "all" checkbox to allow all event notifications or application pop-ups from a particular software vendor or the user may select individual applications. By way of example, when an "All Adobe Applications" checkbox is selected, all the checkboxes for the Adobe applications below may be automatically checked, such as Adobe Reader, Adobe Acrobat and Photoshop.

The custom interrupt manager menu may additionally provide a categories section that allows a user to select categories of communication events for which event notifications may be allowed. Each category may include a particular type or class of event notification and may include several subcategories that may be automatically selected if a particular category is selected. While the implementation shown depicts several categories such as software updates and expiration notification, the scope of the present disclosure is in no way limited to the particular categories provided.

Examples of categories for event notifications or application pop-ups may include, but are not limited to, software updates, registration requests, system warnings, expiration notifications, critical warnings, maintenance reminders, and any other suitable categories. By way of example, a reminder to backup data may be classified as a maintenance reminder and a low battery pop-up may be classified as a system warning. A user may choose to allow pop-ups from an entire category or one or more individual subcategories. For example, within the category of software updates, such updates may be further subcategorized as critical and/or optional software updates. An event notification categorized as a software update may prompt a user to select a single or multiple updates to be downloaded. In some cases, the pop-up may further prompt the user if/when to restart the IHS following the completion of the download. By selecting "all software updates", the critical and optional subcategories of software updates may be automatically selected to allow pop-ups relating to critical and/or optional software updates.

Registration requests may ask the user for certain information to register a product such as a name, address, email address, or the like. Registration requests may be further subcategorized into hardware and software registration requests. System warnings may notify the user of certain events relating to the IHS or attached peripheral devices, such as a low battery, low printer ink, completion of the battery charging process or the like. Expiration notifications may notify a user of the expiration of a subscription or a trial period for a particular software. As another example manufacturer warnings may provide critical information from a manufacturer to a user that requires immediate attention. For instance, a manufacturer warning pop-up may notify the user that a hardware component has been recalled by the manufacturer. In addition, maintenance reminders may inform a user of maintenance task(s) that have not been performed. For instance, a maintenance pop-up may inform the user that the hard drive (HDD) has not been backed up, defragmented, or cleaned recently.

In one implementation, default settings may be provided for the allowed applications and categories. In another implementation, the frequency of event notifications may be managed by the user. For instance, a menu may allow a user to determine how often event notifications such as application pop-ups, for example, are received. By way of example, a user may choose to receive all software updates daily, after a certain number of days, weekly, or the like.

Figure 5:
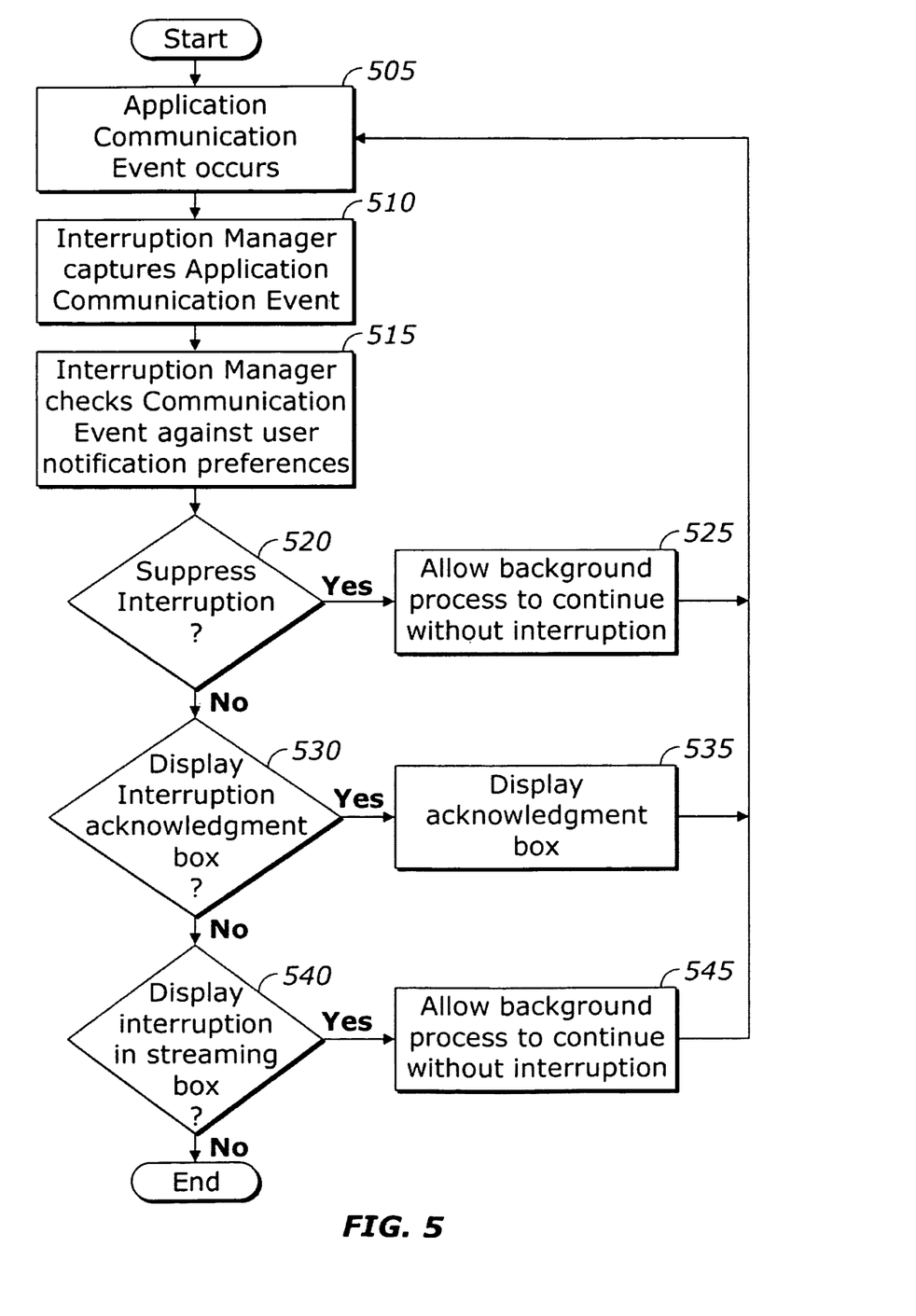
FIG. 5 is a flow diagram representing an interrupt manager processing method in accordance with one aspect of the present disclosure.

Referring now to FIG. 5, a flow diagram is provided illustrating one implementation of an interrupt manager process. In step 505, an interrupt manager process may be initiated when an application communication event occurs. The interrupt manager may provide a centralized location for applications to submit communication events and may capture the application communication events in step 510. The interrupt manager, once configured, may execute consistently as a middleware solution, for example, collecting and monitoring all system and application communication events. Next, the interrupt manager may evaluate the communication event against user notification preferences in step 515. For instance, the interrupt manager may evaluate a communication event type/status against the predefined interrupt level or preferred custom interrupt settings selected by a user (e.g. automatically install updates once per week). Based on the settings selected by a user, the interrupt manager may determine if the communication event or application interrupt should be suppressed in step 520. If the communication event is suppressed, the interrupt manager may prevent the corresponding event notification (e.g., pop-up) from being displayed to the user in step 525. While the user may not see the pop-up, the interrupt manager may allow background tasks associated with the pop-up to continue without interruption. For instance, if the event notification provides notice of a new update, the interrupt manager may allow the update to be downloaded without notifying the user.

Continuing with FIG. 5, if a user chooses to not suppress an event notification, the interrupt manager may determine if the notification should be displayed in an acknowledgement box in step 530. If the interrupt manager settings indicate an acknowledgement box should be displayed for the event notification, the interrupt manager may allow an acknowledgement box to be displayed to the user in step 535. An acknowledgement box may provide an event notification or application pop-up that requires interaction from a user. For example, a communication event providing an acknowledgement box asking a user if he would like to download an update may be displayed to the user if the settings indicate that acknowledgement boxes should be displayed. Based on notification classifications (e.g., display event notification immediately, gather communication event and display/process event notification later, or ignore the event notification) determined by the above evaluation, the interrupt manager may further determine criticality of the event. In so doing, the manager may hold an action (e.g., response to an event notification) for later execution (i.e., a non critical update) or an action may be performed immediately if an event notification is critical in nature (e.g., critical security patch), thus overriding user preferences. Another potential result may be that the interrupt manager decides to ignore an event notification per user preferences. By way of example, a previously acknowledged event notification (e.g., alert) from application trial set to expire may be ignored because the customer has already selected an option not to renew the application. If the settings indicate that the interrupt should not be displayed by way of an acknowledgement box, the interrupt manager may determine if the interrupt should be displayed via a streaming box in step 540. If the settings indicate that a streaming box should be displayed for the communication event, the interrupt may be displayed in streaming box in step 545. A streaming box may provide an event notification that does not require interaction or any response from the user. By way of example, low battery, software trial expiration, or downloading update communication events may be considered to be streaming boxes since the user may not need to provide a response to the notification.

The present disclosure further contemplates an information handling comprising a memory, processor and module (e.g., instructions, program) for performing the aforementioned method(s). In one implementation, the interrupt manager module, executed by the processor, may be operable to receive an interrupt manager setting selection (e.g., low/high interrupt level) to generate at least one event notification associated with a communication event.

An interrupt manager may be a client service residing on an end user's system that provides a centralized location for receiving event notifications from applications residing on the system and filtering the notifications provided to a user. To this end, the interrupt manager may receive event notifications from several applications on an IHS. Based on the application providing the event notification (e.g., pop-up) and/or type of notification, the interrupt manager may filter the notifications in accordance with the user's interrupt settings. Thus, the interrupt manager disclosed herein may efficiently allow an end user to configure, reduce, or disable the occurrence of all event notifications through a single interface rather than requiring configuration of each individual application generating a communication event.

Various methods are contemplated including all or less than all of the steps described herein and/or mentioned above, any number of repeats or any of the steps shown and/or mentioned above, and performance of the steps in any order.

Methods of the present disclosure may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that the above-mentioned media may take various forms such as cards, tapes, magnetic disks (e.g., floppy disk or hard drive), optical disks (e.g., compact disk read only memory ("CD-ROM") or digital versatile disc ("DVD")) or any other medium/media which can be used to store desired information and which can accessed by an IHS. It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for managing a communication event in an information handling system (IHS), the method comprising:
    receiving at least one communication event at an interrupt manager, wherein the interrupt manager manages the at least one communication event from an application;
    receiving a selection of an interrupt manager setting in response to at least one communication event, the interrupt manager setting based on a user setting defining a desired interrupt level, the desired interrupt level based on a frequency of interruptions;
    generating at least one event notification based on the interrupt manager setting selected;
    communicating the at least one event notification to a user;
    determining whether to prompt a user for a to the at least one event notification based on the interrupt manager setting selection, the response requiring an input from the user into the IHS; and
    prompting the user for a response to the at least one event notification in response to determining to prompt the user for a response to the at least one event notification based on the interrupt manager setting selection, the response requiring an input from the user into the IHS.

2. The method of claim 1, wherein the at least one event notification comprises at least one of: a software update, an application registration request, a trial period expiration notification, a system warning, a maintenance reminder, and a critical warning.

3. The method of claim 1, wherein the interrupt manager setting comprises a low interrupt level, a moderate interrupt level, a high interrupt level or a custom interrupt level.

4. The method of claim 3 further comprising providing each of the at least one event notification to the user at the high interrupt level.

5. The method of claim 3 further comprising:
    determining whether the at least one communication event requires user interaction at the moderate interrupt level; and
    if the at least one communication event requires user interaction, providing the at least one communication event to the user.

6. The method of claim 3, wherein the custom interrupt level allows the user to select at least one category for the at least one event notification, wherein the at least one category is selected from a pop-up type, a vendor, an application and a combination thereof.

7. The method of claim 1 further comprising:
    determining whether the at least one communication event is a critical event, wherein the critical event is selected from the group consisting of a critical update, a system warnings and a security update; and
    providing the critical event to the user regardless of the interrupt manager setting selected.

8. A non-transitory computer-readable medium having encoded thereon computer-executable instructions for managing a communication event in an information handling system (IHS), the computer-executable instructions performing a method comprising:
    receiving at least one communication event at an interrupt manager, wherein the interrupt manager manages the at least one communication event from an application;
    receiving a selection of an interrupt manager setting in response to at least one communication event, the interrupt manager setting based on a user setting defining a desired interrupt level, the desired interrupt level based on a frequency of interruptions;
    generating at least one event notification based on the interrupt manager setting selected;
    communicating the at least one event notification to a user and prompting the user for a response to the at least one event notification;
    determining whether to prompt a user for a response to the at least one event notification based on the interrupt manager setting selection, the response requiring an input from the user into the IHS; and
    prompting the user for a response to the at least one event notification in response to determining to prompt the user for a response to the at least one event notification based on the interrupt manager setting selection, the response requiring an input from the user into the IHS.

9. The computer-readable medium of claim 8, wherein the at least one event notification comprises at least one of: a software update, an application registration request, a trial period expiration notification, a system warning, a maintenance reminder, and a critical warning.

10. The computer-readable medium of claim 8, wherein the interrupt manager setting comprises a low interrupt level, a moderate interrupt level, a high interrupt level or a custom interrupt level.

11. The computer-readable medium of claim 10, wherein the method further comprises providing each of the at least one event notification to the user at the high interrupt level.

12. The computer-readable medium of claim 10, wherein the method further comprises:
   determining whether the at least one communication event requires user interaction at the moderate interrupt level; and
   if the at least one communication event requires user interaction, providing the at least one communication event to the user.

13. The computer-readable medium of claim 10, wherein the method further comprises:
   determining whether the at least one communication event is a critical event, wherein the critical event is selected from the group consisting of a critical update, a system warnings and a security update; and
   providing the critical event to the user regardless of the interrupt manager setting selected.

14. The computer-readable medium of claim 10, wherein the custom interrupt level allows the user to select at least one category for the at least one event notification, wherein the at least one category is selected from a pop-up type, a vendor, an application and a combination thereof.

15. An information handling system comprising:
   a memory;
   a processor coupled to the memory; and
   an interrupt manager module operable to receive a selection of an interrupt manager setting, the selection of the interrupt manager setting handled by the processor to generate at least one event notification associated with a communication event of an application, wherein:
      the at least one event notification is based on the interrupt manager setting selected, the interrupt manager setting based on a user setting defining a desired interrupt level, the desired interrupt level based on a frequency of interruptions;
      the at least one event notification is communicated to a user; and
      the user is prompted for a response to the least one event notification in response to a determination to prompt the user for a response to the at least one event notification based on the interrupt manager setting selected, the response to the at least one event notification based on the interrupt manager setting selected requires an input-from the user into the IHS.

16. The system of claim 15, wherein the at least one event notification is selected from a group consisting of a software update, an application registration request, a trial period expiration notification, a system warning, a maintenance reminder, and a critical warning.

17. The system of claim 15, wherein the interrupt manager setting comprises a low interrupt level, a moderate interrupt level, a high interrupt level or a custom interrupt level.

18. The system of claim 15, wherein the custom interrupt level allows the user to select at least one category for the at least one event notification, wherein the at least one category is selected from a pop-up type, a vendor, an application and a combination thereof.

\* \* \* \* \*